July 9, 1968 M. B. WESTOVER 3,391,649
CONVEYOR APPARATUS
Filed Dec. 6, 1965 2 Sheets-Sheet 1

INVENTOR:
MAURICE B. WESTOVER
BY
Carl C. Batz
ATT'Y

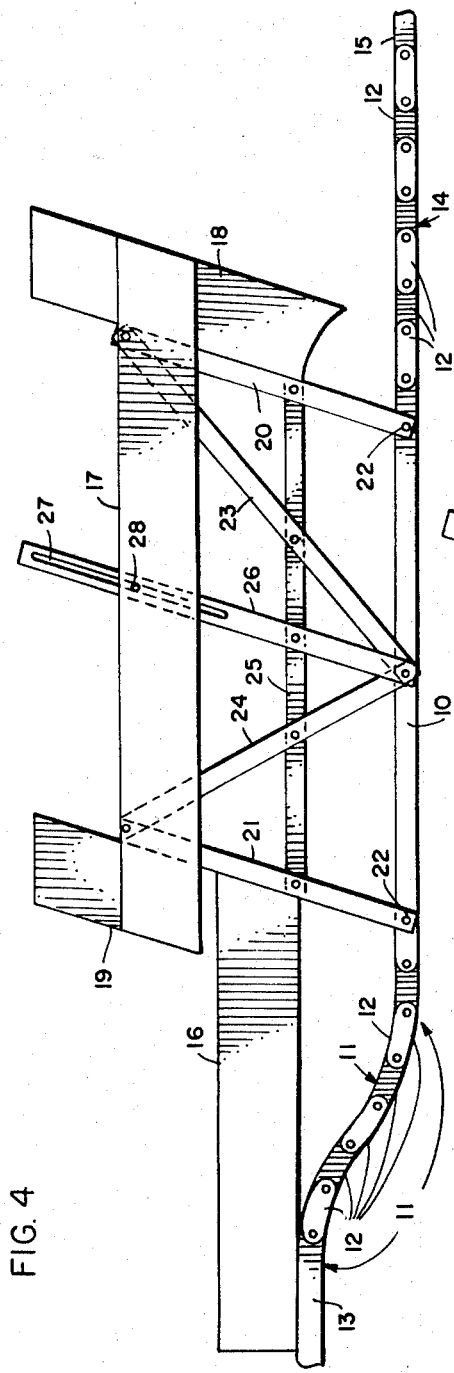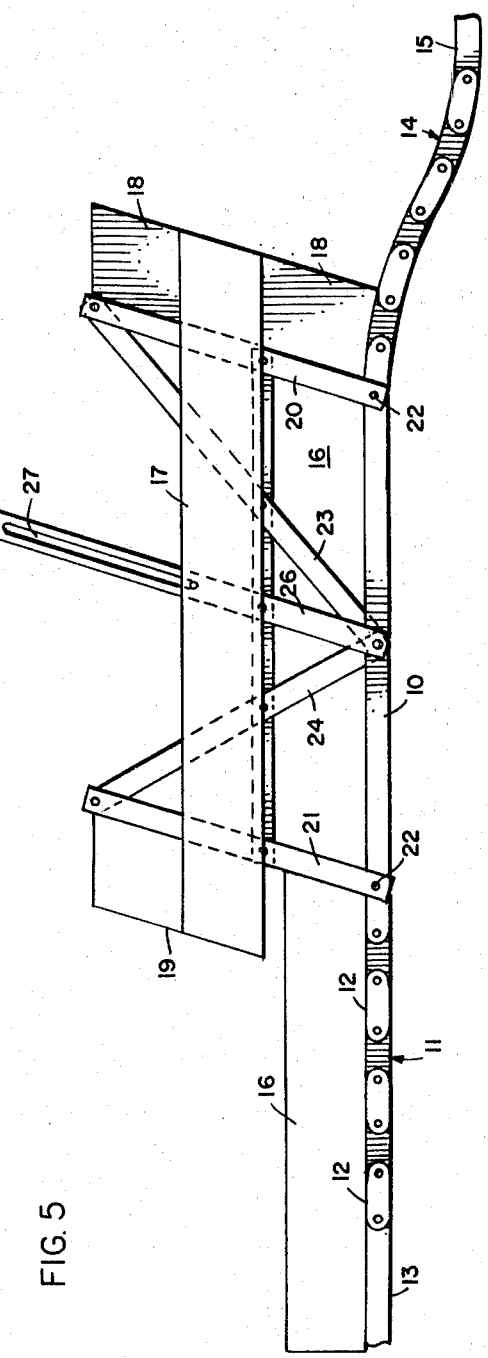

United States Patent Office 3,391,649
Patented July 9, 1968

3,391,649
CONVEYOR APPARATUS
Maurice B. Westover, Chicago, Ill., assignor to Armour and Company, Chicago, Ill., a corporation of Delaware
Filed Dec. 6, 1965, Ser. No. 511,692
6 Claims. (Cl. 104—106)

ABSTRACT OF THE DISCLOSURE

A conveyor is provided between a raised rigid track and a lower rigid track, the conveyor consisting of a rigid central portion and pivotally-connected link sections extending between the ends of the central rigid section and the rigid tracks. By raising the central rigid rail section in a generally vertical and sidewise movement, one of the link sections may be straightened and the other inclined, thus permitting changes in the contour of the conveyor between the rigid tracks without varying the length of the conveyor.

---

Figure 1:
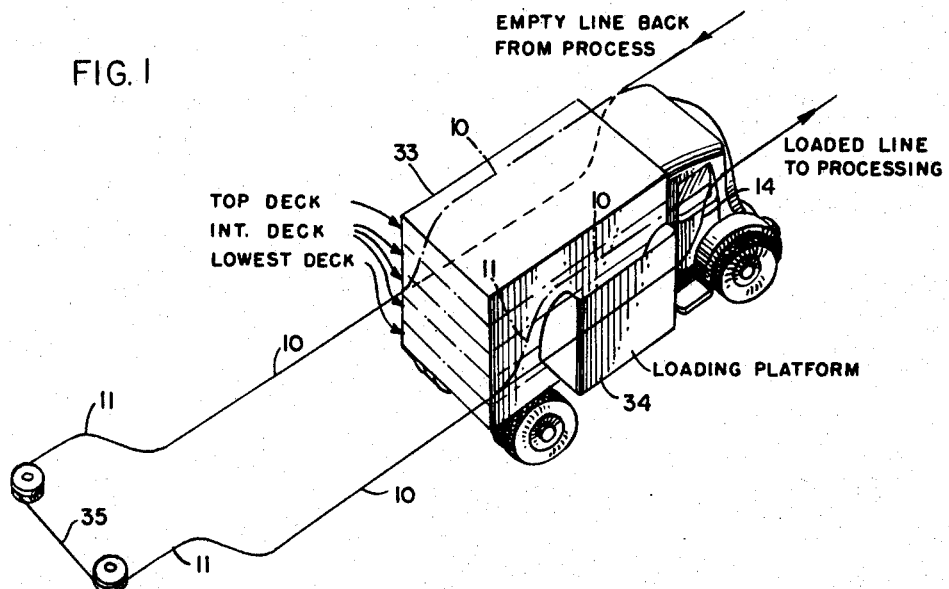

This invention relates to conveyor apparatus, and more particularly to conveyor apparatus in which trolleys are carried by support rails.

In conveyor apparatus in which support rails extend between fixed points, it is often necessary to change the inclination or position of the rails to bring about desired operations, and because the length of the rails is increased or diminished by such change, a substantial and expensive rearrangement of the structure is required. In poultry processing operations, the scald time varies with the type of bird, namely, turkeys, chickens, fowl, etc. Each processing line has a scald tank of fixed length. For turkeys, an elongagated tank is provided and it is desired to utilize the entire length of the tank to effect the necessary scalding action, and the trolley supports are arranged so as to bring the turkeys downwardly into the tank at one end thereof and to remove them at the other end. However, in the scalding of chickens, a shorter period of immersion in the tank is desired, and hence if the elongated tank employed for turkeys is used in the scalding of chickens, the suppor rails must be modified so as to provide a shorter length of rail immediately over one portion of the tank to give the desired shorter distance of immersion. To meet these varying requirements, the rail supports which have to be lengthened or shortened are normally extended beyond the tank to form an expansion loop. The expansion rail loop is thus utilized to take care of these varying requirements in the length of the conveyor. Unfortunately, the loop causes the poultry to be lifted out of the tank in a cycling operation, and such removal is undesirable and has heretofore been considered a necessary evil.

A similar example is found in the loading and unloading of trucks wherein there are fixed limits of movement and where it is desired to raise and lower rail segments of the conveyor in the loading and unloading operation without increasing the length of the conveyor.

I have discovered that conveyor rail supports may be provided between two fixed points and movement can be effected in a vertical direction without increasing or decreasing the length of the conveyor rail. Thus, in an area above a scalding tank, the conveyor rail can be readily adjusted to carry turkeys through the entire length of the tank while the same conveyor rail system can be readily changed to carry chickens through only a portion of the scalding tank. These changes are made without changing the length of the conveyor rails. Further, in the loading and unloading of trucks, conveyor rail portions can be raised or lowered without changing the length of the conveyor rails.

A primary object, therefore, of the invention is to provide a conveyor system wherein a rigid conveyor section may be adjusted for height without changing the total length of horizontal space required for the conveyor system. A further object is to provide an overhead type of height-adjustable conveyor system wherein flexible link sections on either side of a rigid conveyor rail may be adjusted for height without changing the total length of the conveyor rail system. A still further object is to provide overhead trolley-supporting rail means in which a rigid rail is flanked by and pivotally connected to flexibly-connected link rail setcions and in which the link sections are pivotally connected at their outer ends to fixed members and in a position in which one of the link sections is generally inclined and the other section is generally straight. Other specific objects and advantages will appear as the specification proceeds.

Figure 2:
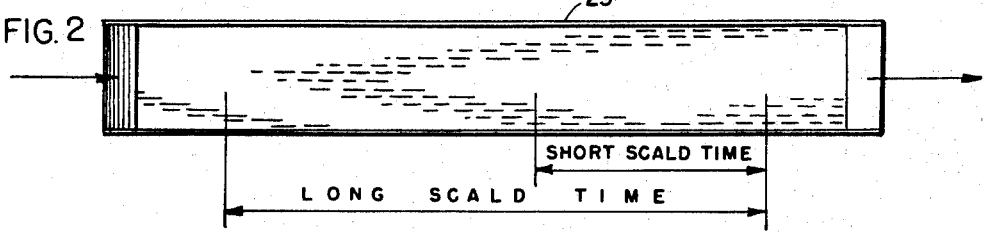
Figure 3:
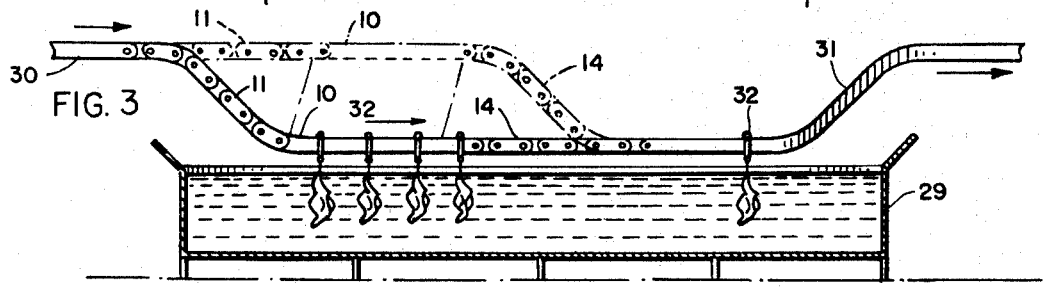

The invention is shown in illustrative embodiments, by the accompanying drawings, in which:

FIGURE 1 is a perspective view of conveyor apparatus embodying my invention and employed in the loading and unloading of a truck; FIG. 2, a top plan view of a scalding tank with which the conveyor apparatus is employed; FIG. 3, a side view in elevation of the scalding tank shown in FIG. 2 and also showing conveyor apparatus employed therewith for providing alternatively a long scald time or a short scald time; FIG. 4, a broken view in side elevation of trolley support rail mechanism, together with means for vertically moving portions of the rail supports; FIG. 5, a view similar to FIG. 4 but showing the rigid rail portion of the trolley-supporting means in elevated position; and FIG. 6, an end view in elevation of the truck and loading platform structure shown in FIG. 1.

In the drawings, and as shown best in FIGS. 4 and 5, I provide a central rigid rail adapted to support trolleys. Pivotally connected to the forward end of rigid rail 10 is a section 11 of pivotally-connected links 12. The link section 11 is connected at its outer end to a stationary member 13 which provides a fixed mounting or support for the outermost link 12 of the section 11. As shown in FIG. 4, the link section 11 is upwardly inclined and held in the upwardly-inclined position by the fixed member 13.

Pivotally secured to the other end of the rigid link 10 is a flexibly-connected link section 14 composed of similar links 12 and the outermost link 12 is connected to a fixed member 15. The members 13 and 15 may be rigid rails, or they may be any form of rigid and fixed support for the outer link sections 11 and 14.

I prefer to have the link sections 11 and 14 of equal length, but, if desired, these may be of different lengths.

In the illustration given in FIG. 4, the link section 11 is in upwardly-inclined position while the link section 14 is in a generally straight and horizontal position. By straightening the section 11 to the position shown in FIG. 5 and by inclining the section 14, as illustrated also in FIG. 5, the rigid link 10 is raised. Likewise, by straightening the section 14 and inclining the section 11 to the positions shown in FIG. 4, the rigid rail 10 is lowered, all as shown in FIG. 4. Thus, by positioning the sections 10, 11 and 14 between fixed points 13 and 15, and with one of the link sections inclined and the other link sections generally straight, it is possible to effect vertical movement of the rail 10 between two fixed points and without lengthening or shortening the conveyor rail supports.

Any suitable mechanism for raising and lowering the conveyor rails, consisting of rail 10 and sections 11 and 14, may be provided. In the illustration given in FIGS. 4 and 5, I provide a rigid frame consisting of longitudinal beams 16 and 17 and, supported upon the longitudinal beams, inclined guide beams 18 and 19. Slidably mounted within the inclined beams 18 and 19 are the lift members 20 and 21. The lower ends of the lift members 21 are pivotally connected at 22 to the rigid rail 10. The members 20 and 21 are rigidly held in an inclined position by the diagonal braces 23 and 24 and the horizontal brace 25. A vertical member 26 is slotted at 27 and receives a pin 28 which extends through the fixed beam 17. With this structure, the frame members 20 and 21 may be moved upwardly, as shown in FIG. 5, to raise the link 10, straightening the section 11 and inclining downwardly the link section 14. Similarly, the frame members 20 and 21 may be moved downwardly to lower the rigid rail 10, straightening the link section 14 and inclining section 11 downwardly. The inclined path followed by the lift members 20 and 21 causes the lifting of the rigid bar 10 in an inclined path to effect straightening of one of the link sections while inclining the other link section.

While I have shown a manually-operable lift frame for moving the rail 10 in a vertically-inclined plane, it will be understood that any power mechanism may be employed for this purpose, such as, for example, a double-acting hydraulic cylinder having its piston connected to the member 26 or to any portion of the frame in which the lift members 20 and 21 are mounted.

In FIGS. 2 and 3 there is shown an elongated scalding tank 29 and at one end of the tank there is supported over the tank a rigid overhead rail 30. At the other end of the tank and extending thereover is a fixed track rise rail 31 employed for lifting the birds from the tank. Extending between the fixed members 30 and 31 is the intermediate rigid rail 10 connected at one end by the flexible link section 11 to the rigid or fixed rail 30, and connected at the other end to the fixed track rise rail 31.

In the scalding tank 21, as shown in FIG. 2, there is indicated a long scale scald time or distance adapted for the scalding of turkeys and a short scald time or distance adapted for the scalding of chickens. To make the single tank 29 effective for handling both chickens and turkeys, the conveyor structure consisting of the central or rigid sections 10 and the two flexible sections 11 and 14 may be employed with the alternate arrangements indicated in FIG. 3. In the arrangement shown in solid lines in FIG. 3, the turkeys may be carried through the scalding tank for the long scald time. By simply raising the central link or section 10 to the elevated position shown in FIG. 3, straightening the flexible link section 11 and inclining the section 14 downwardly, the track system is modified for supporting the trolleys 32 to bring the chickens into the scale tank for the short scald time. The support rail conveyor system may be modified to the two positions shown in FIG. 3 or to intermediate positions depending upon the desired scald time for the birds being processed.

Figure 6:
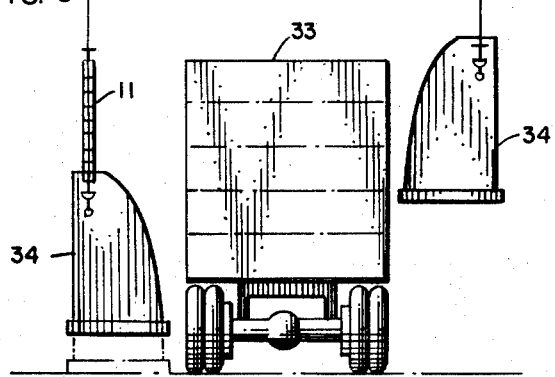

In the illustration given in FIGS. 1 and 6, a truck 33 is shown provided with multiple decks, including a lowermost deck, a top deck and intermediate decks, each of the decks containing turkeys or other types of poultry, and the conveyor systems shown in FIGS. 3, 4 and 5 are utilized here in a plurality of units. Mounted upon the central or rigid link 10 is a loading platform 34, such a platform being provided on each side of the truck as shown in FIG. 6 and being supported at different elevations to facilitate the loading or unloading of the poultry, etc. Using a conveyor system such as is shown in FIGS. 3, 4 and 5 and employing more than one of the units of apparatus, the process of loading and unloading to areas of different elevations and from decks of different elevations is accomplished. Each unit of apparatus employs a central rigid rail 10 and flexible sections 10 and 11 at each end thereof. Extending between the two apparatus units, as shown best in FIG. 1, is a connecting loop rail 35 permitting trolleys to pass on both sides of the truck. The loading or unloading platforms 34 may be supported under the rail 10 so that the operator may load or unload at the optimum height. In the loading and unloading of the truck shown in FIG. 1, the rail 10 and platform 34 suspended below the rail 10 may be raised or lowered to bring the turkeys, chickens, or other objects being handled to the desired elevation for such loading and unloading operations.

Operation

In the operation of the apparatus described, the height of the overhead type of conveyor system shown may be adjusted to bring the rigid rail to an upper or lower position or to any desirable intermediate elevation without changing the total length of horizontal space required for all the sections. In all cases, the sum of the horizontal lengths of the elements 11 plus 10 plus 14 equals the same distance (from fixed points 13 to 15). Straightening the section 11 shown in FIG. 4 while inclining downwardly section 14 brings about a raising of the rail 10, as illustrated best in FIG. 5. By moving the members 20 and 21 downwardly, as illustrated in FIG. 4, there is a lowering of the rail 10, a straightening of the section 14, and an upwardly inclining of the section 11. Thus, between two fixed points 13 and 15 of different elevation, and with a pre-arranged angled position of one link section and a straight arrangement of the other link section, various compensating positions of the sections 11 and 14 may be achieved without changing the length of these flexible and rigid rail sections.

While in the foregoing description specific illustrations of the use of the invention are set out dealing with the scalding of poultry and the loading and unloading of the same, the invention is obviously applicable to a great many other uses and to the handling of other products and objects, and such examples set out herein have been for illustrative purposes only.

While in the foregoing specification I have set forth specific structures in considerable detail for the purpose of illustrating the invention, it will be understood that such details may be varied widely by those skilled in the art without departing from the spirit of my invention.

I claim:

1. In conveyor apparatus comprising: trolleys and rails for supporting the same, a central horizontal rigid rail and flexibly-connected link sections at each end of said rail pivotally connected thereto, said link sections having their outer ends pivotally connected to spaced supports with one of said link sections generally inclined and the other link section substantially straight, whereby vertical movement of said central rail may be effected with a straightening of said inclined link section and an inclining of said generally straight section.

2. The structure of claim 1 in which said flexibly-connected link sections are substantially equal in length.

3. In conveyor apparatus comprising: trolleys and rails for supporting the same, a rigid rail, flexibly-connected link sections at each end of said rigid rail and pivotally connected thereto, vertically-spaced rigid supports pivotally connected to the outer ends of said link sections, said link sections being arranged so that one is inclined and the other generally straight, and means for moving said rigid rail to straighten said inclined link section and to incline said generally straight section.

4. The structure of claim 3 in which said moving means is guided for movement in an inclined path.

5. In conveyor apparatus having rail supports and trolleys carried thereby, a rigid rail, flexibly-connected link sections pivotally connected to and flanking said rigid rail, fixed supports in vertically-spaced relation pivotally connected to the ends of said flexibly-connected link sections, one of said link sections being inclined and the other being substantially straight, and means for straightening said inclined section and inclining said straight section without varying the length of the conveyor between said fixed supports.

6. In conveyor apparatus comprising: conveyor rail supports, a substantially rigid rail, fixed supports on each side of said rail and spaced therefrom, flexibly-connected link sections pivotally connecting said central rail to said fixed supports, one of said link sections being inclined and the other being generally straight, said inclined section being adapted to be straightened and said generally straight section being adapted to be inclined to change the elevation of said rigid rail without varying the length of the conveyor between said fixed supports.

References Cited

UNITED STATES PATENTS

| | | | |
|---|---|---|---|
| 135,972 | 2/1873 | De Leidi | 104—164 |
| 222,601 | 12/1879 | Reager | 104—113 |
| 270,513 | 1/1883 | Thompson | 104—164 |
| 342,757 | 5/1886 | Morrison | 104—164 |
| 2,852,805 | 9/1958 | Corey et al. | 17—11.2 |

ARTHUR L. LA POINT, *Primary Examiner.*

J. E. BABER, D. F. WORTH, *Assistant Examiners.*